(12) United States Patent
Oota

(10) Patent No.: US 12,129,883 B2
(45) Date of Patent: Oct. 29, 2024

(54) SECURITY NUT AND SECURITY BOLT

(71) Applicant: IWATA BOLT KABUSHIKI KAISHA, Tokyo-to (JP)

(72) Inventor: Ryuya Oota, Tokyo-to (JP)

(73) Assignee: IWATA BOLT KABUSHIKI KAISHA, Tokyo (JP)

( * ) Notice: Subject to any disclaimer, the term of this patent is extended or adjusted under 35 U.S.C. 154(b) by 316 days.

(21) Appl. No.: 17/696,060

(22) Filed: Mar. 16, 2022

(65) Prior Publication Data
US 2022/0316519 A1   Oct. 6, 2022

(30) Foreign Application Priority Data

Apr. 1, 2021 (JP) ................................. 2021-063099

(51) Int. Cl.
*F16B 23/00* (2006.01)
*F16B 33/02* (2006.01)

(52) U.S. Cl.
CPC .......... *F16B 33/02* (2013.01); *F16B 23/0076* (2013.01)

(58) Field of Classification Search
CPC .... F16B 33/02; F16B 23/0076; F16B 41/005; F16B 23/0007; F16B 35/00; F16B 37/00; F16B 23/0038
USPC ...................................... 411/366.3, 911, 402
See application file for complete search history.

(56) References Cited

U.S. PATENT DOCUMENTS

| | | | | |
|---|---|---|---|---|
| 2,770,998 A | * | 11/1956 | Schwartz | ............ F16B 23/0061 81/461 |
| 3,482,481 A | * | 12/1969 | Newell | .................... B25B 13/04 D8/397 |
| 4,125,051 A | * | 11/1978 | Herkes | .................. F16B 35/042 411/911 |

(Continued)

FOREIGN PATENT DOCUMENTS

| | | | | |
|---|---|---|---|---|
| CN | 108180208 A | * | 6/2018 | .............. F16B 37/00 |
| DE | 102015213554 A1 | * | 1/2017 | |

(Continued)

OTHER PUBLICATIONS

Jul. 7, 2023, Machine Translation of Office Action issued in Chinese Patent Application No. 202210258399.8 (Year: 2023).*

(Continued)

*Primary Examiner* — Kristina R Fulton
*Assistant Examiner* — Jock Wong
(74) *Attorney, Agent, or Firm* — Oliff PLC

(57) ABSTRACT

A nut and a bolt are provided, which make it difficult to be loosened once they have been tightened. A security nut includes: a nut body having an inside screw; and a plurality of torque transmission projections provided on an outer surface of the nut body along a circumferential direction. Each torque transmission projection has a torque transmission surface provided on an upstream side in a tightening direction of the security nut, and a release surface provided on a downstream side in the tightening direction of the security nut. A ridge line is formed between the release surface and the torque transmission surface, the ridge line inclining toward the upstream side of the tightening direction along the circumferential direction, from an advancing-direction end of the nut body to a retracting-direction end of the nut body.

8 Claims, 10 Drawing Sheets

(56) References Cited

U.S. PATENT DOCUMENTS

| | | | | | |
|---|---|---|---|---|---|
| 5,340,256 | A | * | 8/1994 | Morgan | F16B 23/00 411/405 |
| 5,647,712 | A | * | 7/1997 | Demirdogen | F16B 23/0076 411/404 |
| 2004/0182206 | A1 | * | 9/2004 | Korpi | F16B 41/005 81/121.1 |
| 2008/0145181 | A1 | * | 6/2008 | Lynes | B25B 13/485 81/125 |
| 2011/0283843 | A1 | * | 11/2011 | Werner | F16B 23/0061 81/461 |
| 2015/0184686 | A1 | * | 7/2015 | Hasegawa | F16B 23/0076 411/4 |

FOREIGN PATENT DOCUMENTS

| | | | | | |
|---|---|---|---|---|---|
| FR | 3016665 | A1 | * | 7/2015 | F16B 23/0076 |
| GB | 2316989 | A | * | 3/1998 | F16B 23/0076 |
| JP | H11-351228 | A | | 12/1999 | |
| JP | 5113956 | B1 | | 1/2013 | |
| KR | 20120080349 | A | * | 7/2012 | |
| WO | WO-2008142191 | A1 | * | 11/2008 | B25B 13/065 |
| WO | WO-2016103751 | A1 | * | 6/2016 | F16B 23/00 |

OTHER PUBLICATIONS

Jul. 7, 2023 Office Action issued in Chinese Patent Application No. 202210258399.8.

* cited by examiner

SECURITY NUT AND SECURITY BOLT

FIELD

The present disclosure relates to a security nut and a security bolt.

BACKGROUND ART

Conventional nuts and bolts have been developed to make it difficult for others to loosen them once they have been tightened. For example, JP 5113956 B describes a nut and a bolt which have a head engageable only with a dedicated tool, and thus can be tightened only with the dedicated tool. Such a nut and a bolt are useful, for example, to prevent others from disassembling machinery or equipment which has been assembled using the nut and the bolt. In particular, such a nut and a bolt are useful for preventing theft of machinery or equipment assembled by means of the nut and the bolt, and for hiding an internal structure of the machinery or equipment from others.

The nut and the bolt described in Patent Document 1 (JP 5113956 B) lack versatility because they require a dedicated tool suitable for them when they are tightened. In addition, preparation of the dedicated tool may increase the cost.

The present disclosure has been made in view of the above circumstances. The object of the present disclosure is to provide a nut and a bolt that make it difficult to be loosened once they have been tightened.

SUMMARY

A security nut according to the present disclosure comprises:
a nut body having an inside screw; and
a plurality of torque transmission projections provided on an outer surface of the nut body along a circumferential direction;
wherein:
each torque transmission projection has a torque transmission surface provided on an upstream side in a tightening direction of the security nut, and a release surface provided on a downstream side in the tightening direction of the security nut; and
a ridge line is formed between the release surface and the torque transmission surface, the ridge line inclining toward the upstream side of the tightening direction along the circumferential direction, from an advancing-direction end of the nut body to a retracting-direction end of the nut body.

In the security nut according to the present disclosure, a flange may be provided on the advancing-direction end of the nut body.

In the security nut according to the present disclosure, an annular protrusion may be provided on the retracting-direction end of the nut body.

In the security nut according to the present disclosure, L1, L2 and L3 may satisfy below relationships:

$$0.5 \times L3 \leq L2 \leq L3 \qquad \text{Expression (1)}$$

$$0.2 \times L1 \leq L2 \leq 0.4 \times L1 \qquad \text{Expression (2)}$$

where L1 represents a circumferential pitch between the torque transmission projections, L2 represents a circumferential length of the torque transmission surface of each torque transmission projection, and L3 represents a circumferential length of the release surface of each torque transmission projection.

A security bolt according to the present disclosure comprises:
a shaft part having an outside screw; and
a bolt head part provided on the shaft part, the bolt head part having a bolt head part body, and a plurality of torque transmission projections provided on an outer surface of the bolt head part body along a circumferential direction;
wherein:
each torque transmission projection has a torque transmission surface provided on an upstream side in a tightening direction of the security bolt, and a release surface provided on a downstream side in the tightening direction of the security bolt;
and
a ridge line is formed between the release surface and the torque transmission surface, the ridge line inclining toward the upstream side of the tightening direction along the circumferential direction, from an advancing-direction end of the bolt head part body to a retracting-direction end of the bolt head part body.

In the security bolt according to the present disclosure, the bolt head part body may have a flange provided on the advancing-direction end of the bolt head part body.

In the security bolt according to the present disclosure, the bolt head part body may have a truncated conical protrusion provided on the retracting-direction end of the bolt head part body.

In the security bolt according to the present disclosure, L4, L5 and L6 may satisfy below relationships:

$$0.5 \times L6 \leq L5 \leq L6 \qquad \text{Expression (3)}$$

$$0.2 \times L4 \leq L5 \leq 0.4 \times L4 \qquad \text{Expression (4)}$$

where L4 represents a circumferential pitch between the torque transmission projections, L5 represents a circumferential length of the torque transmission surface of each torque transmission projection, and L6 represents a circumferential length of the release surface of each torque transmission projection.

The present disclosure can provide a nut and a bolt that make it difficult to be loosened once they have been tightened.

DETAILED DESCRIPTION

First Embodiment

A nut of a first embodiment of the present disclosure is described first with reference to FIGS. 1 to 6. The nut of the first embodiment is a security nut 1 that makes it difficult to be loosened once it has been tightened.

Figure 1:
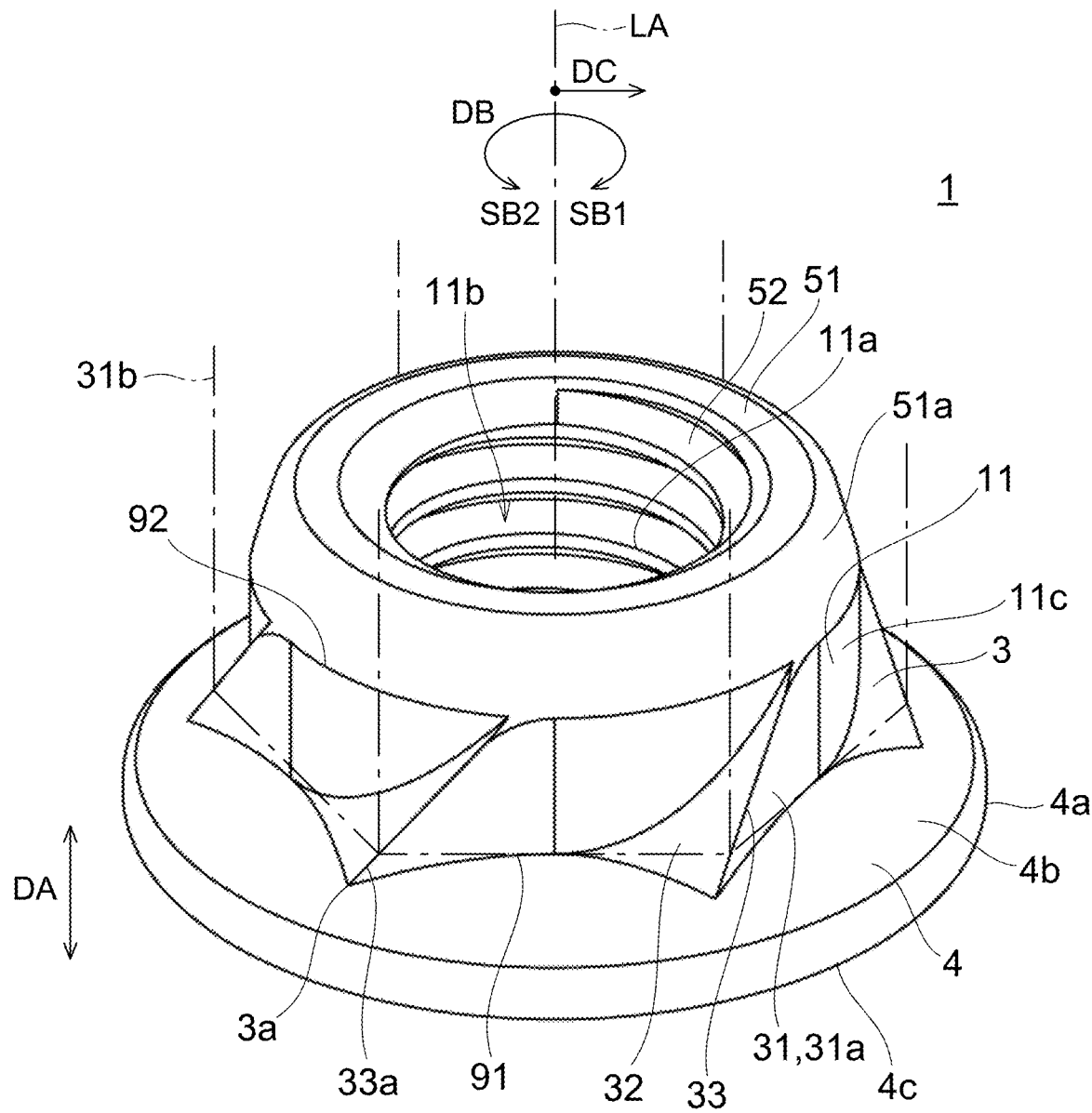
FIG. 1 is a perspective view showing an example of a security nut according to a first embodiment.

FIG. 1 is a perspective view showing the security nut 1. As shown in FIG. 1, the security nut 1 comprises a nut body 11 having an inside screw 11a, and a plurality of torque transmission projections 3 provided on an outer surface 11c of the nut body 11 along a circumferential direction DB. The security nut 1 shown in FIG. 1 further comprises a flange 4 provided on an advancing-direction end 91 of the nut body 11, and an annular protrusion 51 provided on a retracting-direction end 92 of the nut body 11. In the example shown in FIG. 1, the nut body 11, the torque transmission projections 3, the flange 4 and the annular protrusion 51, which constitute the security nut 1, are integrally formed. A material of the security nut 1 is, for example, a metal material similar to that of a general nut.

The security nut 1 is rotated about an axis LA, when tightened on a bolt. In the first embodiment, a direction of the axis LA is referred to as an axial direction DA, and a direction surrounding the axis LA is referred to as a circumferential direction DB. A direction of the axial direction DA along which the security nut 1 moves when it is tightened is referred to as an advancing direction, and a direction thereof along which the security nut 1 moves when it is loosened is referred to as a retracting direction. Further, an advancing-direction end of the nut body 11 of the security nut 1 is the advancing-direction end 91, and a retracting-direction end thereof is the retracting-direction end 92. A radial direction of the security nut 1 is referred to as a radial direction DC.

A direction of the circumferential direction DB along which the security nut 1 is tightened is referred to as a tightening direction SB1, and a direction thereof along which the security nut 1 is loosened is referred to as a loosening direction SB2.

Next, respective constituent elements of the security nut 1 are further described.

First, the nut body 11 is described. As described above, the nut body 11 is a part of the security nut 1, which has the inside screw 11a. In the example shown in FIG. 1, the nut body 11 has a through hole 11b extending in the axial direction DA. The inside screw 11a is provided in an inner wall of the through hole 11b. In addition, in the example shown in FIG. 1, the nut body 11 has a cylindrical shape an axis of which is the axis LA. Thus, an outer surface 11c of the nut body 11 is a curved surface corresponding to a cylindrical side surface, which makes it difficult to grip the nut body 11 by a general tool such as pliers. Thus, it is difficult to loosen the tightened security nut 1 by gripping and rotating the nut body 11 by a general tool such as pliers.

Figure 2:
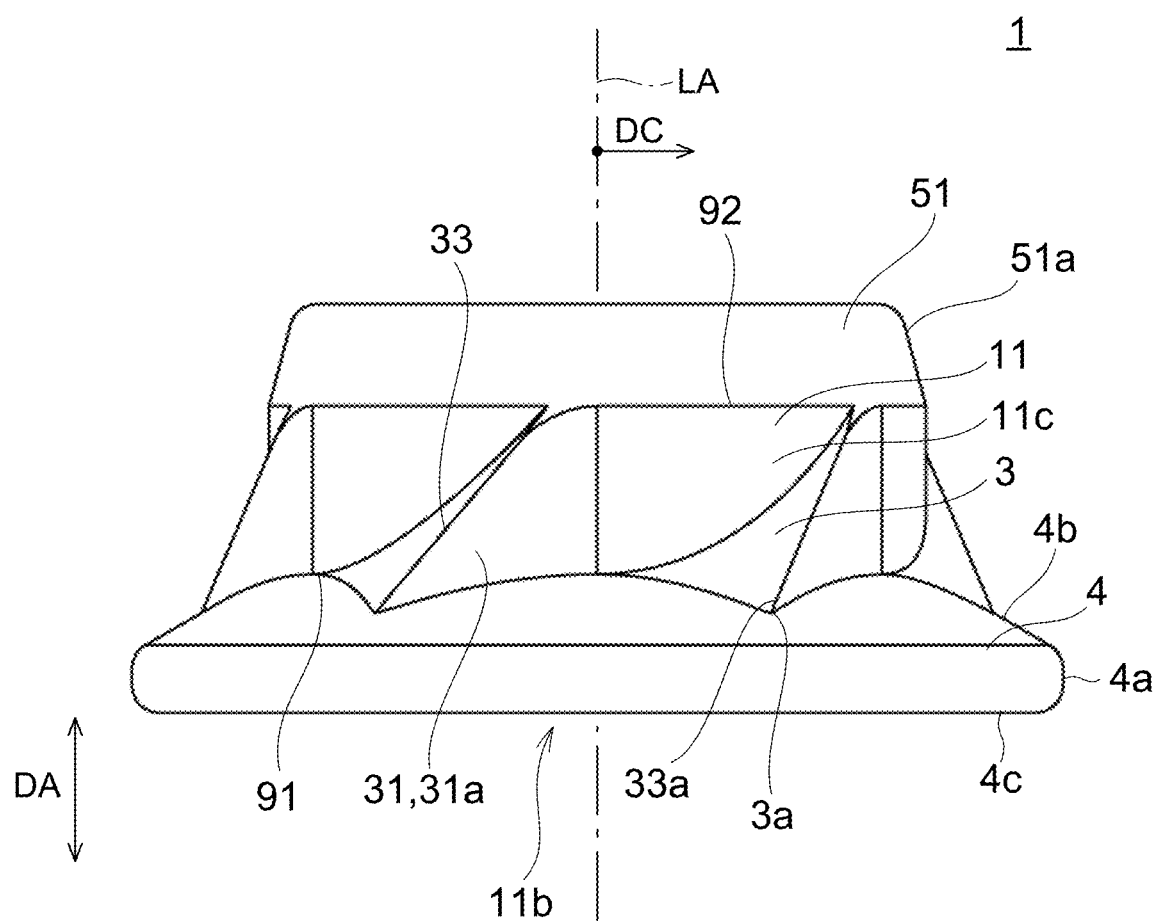
Fig. 2 is a side view showing the example of the security nut according to the first embodiment.

FIG. 2 is a side view of the securing nut 1 seen from a lateral side. As described below, for example, the security nut 1 is tightened on a general bolt 71 (see FIG. 5). When the security nut 1 is tightened on the bolt 71, the bolt is inserted into the through hole 11b from the advancing-direction end 91 of the nut body 11.

By inserting the bolt 71 into the through hole 11b from the advancing-direction end 91 of the nut body 11 and by rotating the security nut 1 in the tightening direction SB1, the inside screw 11a can be meshed with an outer screw of the bolt. Thus, the security nut 1 can be tightened on the bolt.

Next, the torque transmission projections 3 are described. The torque transmission projections 3 are provided on the outer surface of the nut body 11 along the circumferential direction DB.

Each torque transmission projection 3 has a torque transmission surface 31 provided on an upstream side in the tightening direction SB1 of the security nut 1, and a release surface 32 provided on a downstream side in the tightening direction SB1 of the security nut 1.

In addition, a ridge line 33 is formed between the torque transmission surface 31 and the release surface 32. The ridge line 33 inclines toward the upstream side of the tightening direction SB1 along the circumferential direction DB, from the advancing-direction end 91 of the nut body 11 to the retracting-direction end 92 of the nut body 11 (see FIG. 2).

When the security nut 1 is rotated in the tightening direction SB1 by means of a general tool for rotating a nut, such as a general wrench, the torque transmission surface 31 receives a torque transmitted from the wrench to the security nut 1.

The security nut 1 according to the first embodiment is formed such that, when a hexagonal socket 81 of a below-described general socket wrench 8 is engaged with the security nut 1, at least a part of the torque transmission surface 31 comes into surface-contact with an inner surface 8a of the hexagonal socket 81. In this case, when the security nut 1 is rotated in the tightening direction SB1, a torque is transmitted to the security nut 1 through a part (parallel surface 31a described below) of the torque transmission surface 31, which is in surface-contact with the inner surface 8a of the hexagonal socket 81. In the example shown in FIG. 1, the torque transmission surface 31 includes a parallel surface 31a parallel to the axial direction DA. When the socket wrench 8 is engaged with the security nut 1, the parallel surface 31a comes into surface-contact with the inner surface 8a of the hexagonal socket 81.

The release surface 32 forms, between it and the torque transmission surface 31, the ridge line 33. In the example shown in FIGS. 1 and 2, the ridge line 33 inclines toward the upstream side of the tightening direction SB1 along the circumferential direction DB, from the advancing-direction end 91 of the nut body 11 to the retracting-direction end 92 of the nut body 11. Thus, the release surface 32 is formed such that, when the hexagonal socket 81 is engaged with the security nut 1 and is rotated in the loosening direction SB2, the release surface 32 does not come into contact with the inner surface 8a of the hexagonal socket 81. In this case, the inner surface 8a of the hexagonal socket 81 bears against the ridge lines 33 without being in contact with the release surfaces 32.

As described above, the ridge line 33 inclines toward the upstream side of the tightening direction SB1 along the circumferential direction DB, from the advancing-direction end 91 of the nut body 11 to the retracting-direction end 92 of the nut body 11. Thus, as described below, when the hexagonal socket 81 is engaged with the security nut 1 and is rotated in the loosening direction SB2, the ridge line 33 guides the hexagonal socket 81 to float up.

The number, shape and arrangement of the torque transmission projections 3 of the security nut 1 can be suitably determined in accordance with a tool to be used for rotating the security nut 1. In the security nut 1 according to the first embodiment, the number, shape and arrangement of the torque transmission projections 3 are determined on the assumption that the security nut 1 is rotated by means of the below-described general socket wrench 8 having the hexagonal socket 81.

Figure 3:
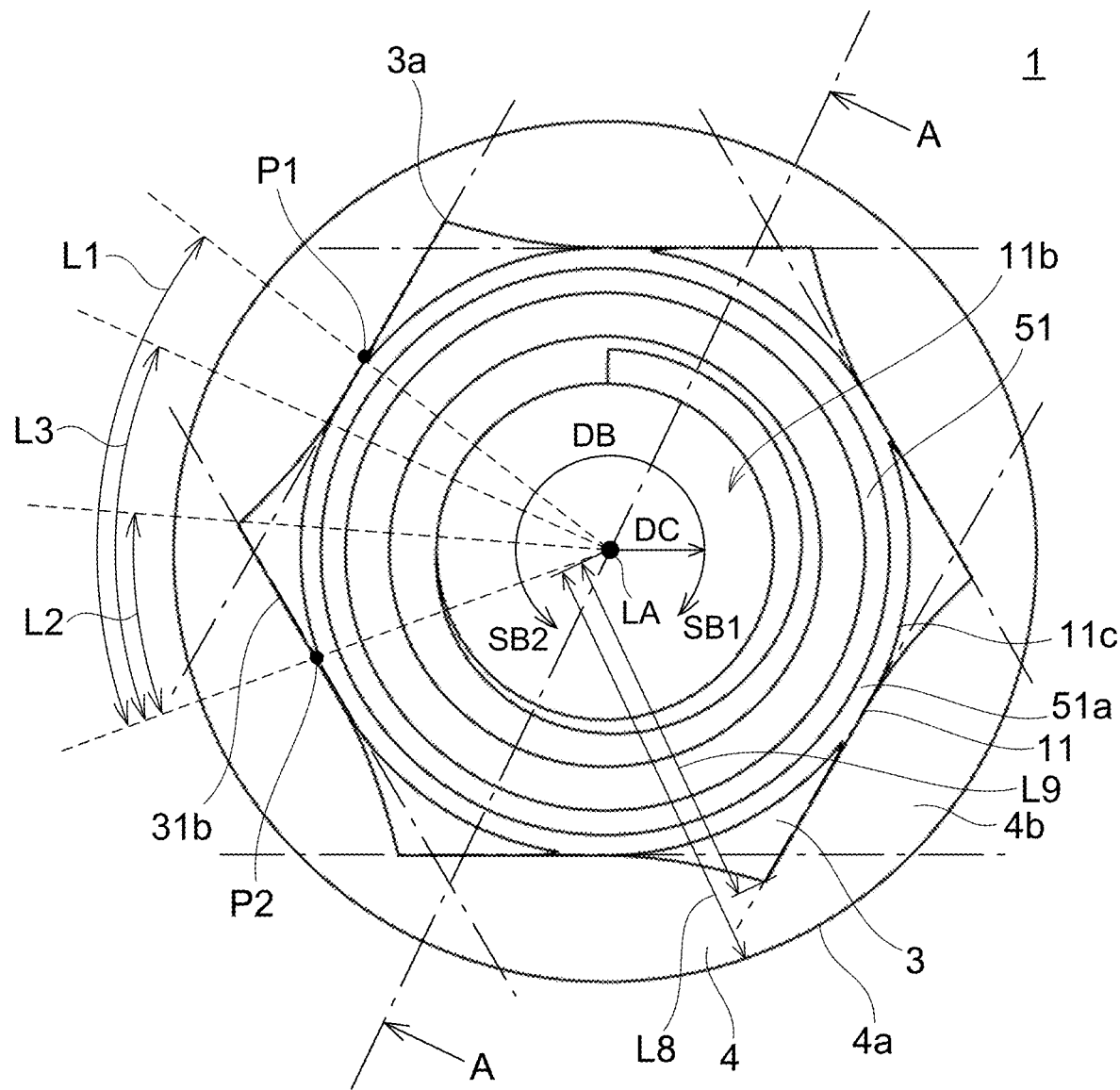
FIG. 3 is a plan view showing the example of the security nut according to the first embodiment.

FIG. 3 is a plan view showing the security nut 1 seen from the retracting-direction end 92 of the nut body 11. In the example shown in FIGS. 1 to 3, the security nut 1 comprises the six torque transmission projections 3. Although not shown, on the assumption that the security nut 1 is rotated by means of the below-described general socket wrench 8 having the hexagonal socket 81, the number of the torque transmission projections 3 of the security nut 1 may not be six. For example, the number of the torque transmission projections 3 of the security nut 1 may be five or less. Also in this case, a torque can be transmitted to the security nut 1 through the torque transmission surface 31 of each of the torque transmission projections 3. However, from the viewpoint of more stably transmitting a torque to the security nut 1, the security nut 1 preferably comprises the six torque transmission projections 3. Herebelow, the security nut 1 comprising the six torque transmission projections 3 as shown in FIGS. 1 to 3 is described by way of example.

In the example shown in FIG. 3, the torque transmission projections 3 are arranged at equal intervals therebetween in the circumferential direction DB. A circumferential pitch L1 of the torque transmission projections 3 is determined as described below. As shown in FIG. 3, an intersection point between the ridge line 33 of one torque transmission projection 3 and the outer surface 11c of the nut body 11 is set as a point P1, and an intersection point between the ridge line 33 of another torque transmission projection 3, which is adjacent to the one torque transmission projection 3, and the outer surface 11c of the nut body 11 in the circumferential direction DB is set as a point P2. Then, a distance from the point P1 to the point P2 along the circumferential direction DB is the circumferential pitch L1.

The respective torque transmission projections 3 have the same shape with one another. Thus, circumferential lengths L2 of the torque transmission surfaces 31 of the torque transmission projections 3 are the same with one another. Similarly, circumferential lengths L3 of the release surfaces 32 of the torque transmission projections 3 are the same with one another.

The circumferential length L2 of the torque transmission surface 31 is a length along the circumferential direction DB of a part of the outer surface 11c of the nut body 11, at which a part of the torque transmission projection 3, which forms the torque transmission surface 31, is provided. In addition, the circumferential length L3 of the release surface 32 is a length along the circumferential direction DB of a part of the outer surface 11c of the nut body 11, at which a part of the torque transmission projection 3, which forms the release surface 32, is provided.

Here, the circumferential pitch L1 between the torque transmission projections 3, the circumferential direction L2 of the torque transmission surface 31, and the circumferential direction L3 of the release surface 32 preferably satisfy the following relationships.

$$0.5 \times L3 \leq L2 \leq L3 \quad \text{Expression (1)}$$

$$0.2 \times L1 \leq L2 \leq 0.4 \times L1 \quad \text{Expression (2)}$$

In particular, when the circumferential length L2 of the torque transmission surface 31 is 0.5 times or more the circumferential length L3 of the release surface 32, and is 0.2 times or more the circumferential pitch L1, the following effect can be obtained. The circumferential length L2 of the torque transmission surface 31 can be sufficiently ensured, whereby a surface area of the torque transmission surface 31 can be sufficiently ensured. Thus, a torque from a tool rotating the security nut 1 can be transmitted to the security nut 1 in a sufficiently stable manner.

Here, a virtual surface 31b, which is an extension of the parallel surface 31a of each torque transmission 3, is considered. One-dot chain lines shown in FIGS. 1 and 3 indicate positions of the virtual surfaces 31b. As shown in FIGS. 1 and 3, the virtual surfaces 31b extended from the parallel surfaces 31a of the respective torque transmission projections 3 connect to one another to form a hexagonal columnar shape. Such a security nut 1 enables the hexagonal socket 81, which is engageable with the hexagonal columnar shape formed by the virtual surfaces 31b, to be engaged therewith and rotated.

As shown in FIGS. 1 and 3, a tip 3a of the torque transmission projection 3 is located more outward in the radial direction DC than side surfaces of the hexagonal prism formed by the virtual surfaces 31b. The ridge line 33 of the torque transmission projection 3 has a tip portion 33a that extends more outward in the radial direction DC than the side surfaces of the hexagonal prism formed by the virtual surfaces 31b.

Figure 4:
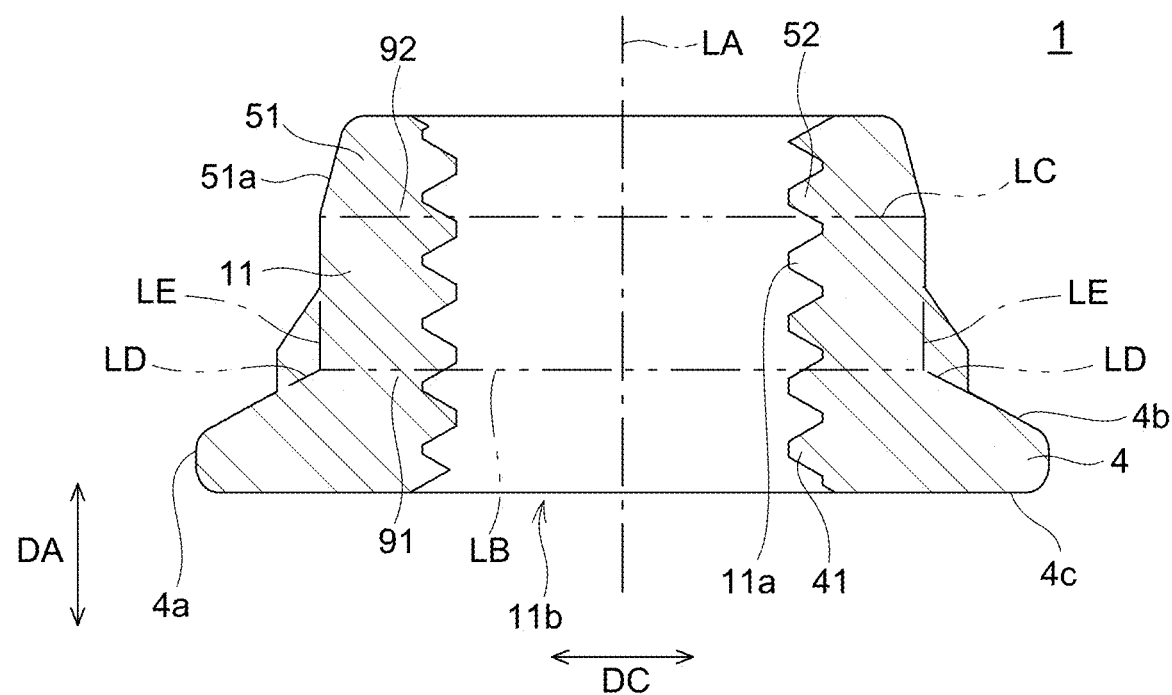
FIG. 4 is a sectional view of the security nut according to the first embodiment taken along an A-A line in FIG. 3.

Next, the flange 4 provided on the advancing-direction end 91 of the nut body 11 is described with reference to FIGS. 3 and 4. FIG. 4 is a sectional view of the security nut 1 taken along an A-A line in FIG. 3. One-dot chain lines LB shown in FIG. 4 show a boundary between the nut body 11 and the flange 4 for descriptive purposes. One-dot chain lines LD shown in FIG. 4 show a boundary between the torque transmission projection 3 and the flange 4 for descriptive purposes. One-dot chain lines LE shown in FIG. 4 show a boundary between the nut body 11 and the torque transmission projection 3 for descriptive purposes. The flange 4 is provided on the advancing-direction end 91 of the nut body 11. In the example shown in FIG. 3, the flange 4 has a circular profile about the axis LA seen from the axial direction DA. When the security nut 1 is seen from the retracting-direction end 92 of the nut body 11 as shown in FIG. 3, the flange 4 has a flat annular shape formed to surround the nut body 11 from the radial direction DC. The flange 4 has a rim part 4a forming an outer surface, a first surface 4b located on the side of the retracting-direction end 92, and a second surface 4c located ahead of the first surface 4b in the direction in which the advancing-direction end 91 is directed and opposed to the first surface 4b.

The first surface 4b of the flange 4 is inclined inward in the radial direction DC from the rim part 4a toward the retracting-direction end 92. The second surface 4c is a plane perpendicular to the axial direction DA.

As shown in FIG. 3, a distance L8 in the radial direction DC between the rim part 4a of the flange 4 and the axis LA is longer than a distance L9 in the radial direction DC between the tip 3a of the torque transmission projection 3 and the axis LA. The torque transmission surface 31 and the release surface 32 of the torque transmission projection 3 are both connected to the first surface 4b of the flange 4. Thus, the ridge line 33 of the torque transmission projection 3 is also connected to the first surface 4b of the flange 4, whereby the torque transmission projection 3 supported by the flange 4 can have an improved strength.

As shown in FIG. 4, a first extension inside screw 41 is provided on an inner surface of the flange 4. The first extension inside screw 41 is provided to be in continuous with the inside screw 11a of the nut body 11.

Next, the annular protrusion 51 provided on the retracting-direction end 92 of the nut body 11 is described with reference to FIG. 4. The annular protrusion 51 is provided on the retracting-direction end 92 of the nut body 11. Two-dot chain lines LC shown in FIG. 4 show a boundary between the nut body 11 and the annular protrusion 51 for descriptive purposes. The annular protrusion 51 has a shape that inhibits the security nut 1 from being grasped by means of a general tool such as pliers. In the example shown in FIG. 4, an outer surface 51a of the annular protrusion 51 is inclined to expand outward in the radial direction DC toward the advancing-direction end 91. Since the outer surface 51a of the annular protrusion 51 is inclined to expand outward in the radial direction DC toward the advancing-direction end 91, it is difficult to grasp the outer surface 51a by means of a general tool such as pliers, which makes it difficult to loosen the security nut 1 by means of a general tool.

As shown in FIG. 4, a second extension inside screw 52 is provided on an inner surface of the annular protrusion 51. The second extension inside screw 52 is provided to be in continuous with the inside screw 11a of the nut body 11.

(Operation)

Next, an operation of the security nut 1 as structured above is described.

(Operation Upon Tightening)

Figure 5:
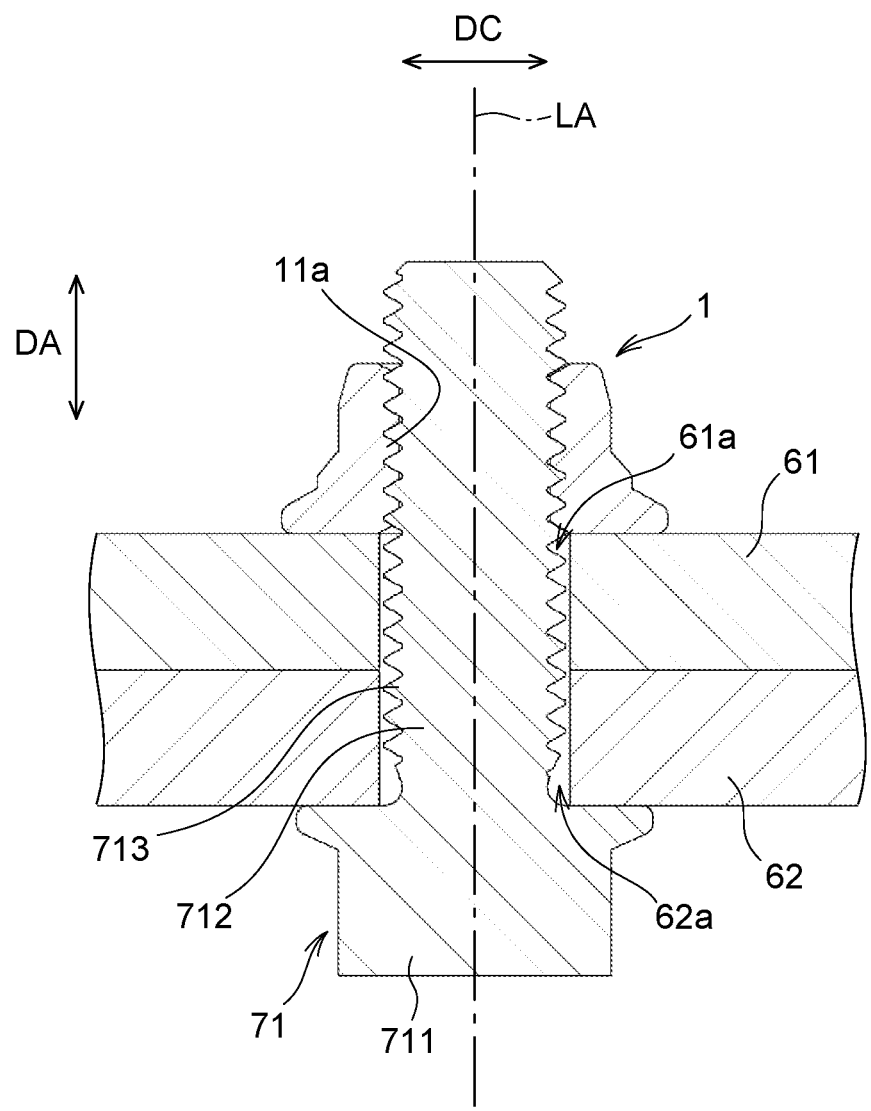
FIG. 5 is a sectional view showing that the security nut according to the first embodiment is tightened on a general bolt.

An example of an operation when the security nut 1 is tightened on a bolt is described with reference to FIG. 5. FIG. 5 is a sectional view showing that a plurality of securement members 61, 62 are secured to each other by tightening the security nut 1 on a bolt 71. In the example shown in FIG. 5, the plate-shaped first securement member 61 and the plate-shaped second securement member 62 are secured to each other by tightening the security nut 1 on the bolt 71.

As shown in FIG. 5, when the security nut 1 is tightened on the bolt 71, the first securement member 61 provided with a first bolt hole 61a and the second securement member 62 provided with a second bolt hole 62a are prepared first.

Then, the first securement member 61 and the second securement member 62 are stacked such that the first bolt hole 61a and the second bolt hole 62a are aligned.

Then, the bolt 71 comprising a shaft part 712 having an outside screw 713 and a bolt head part 711 is prepared, and the shaft part 712 of the bolt 71 is inserted through the first bolt hole 61a and the second bolt hole 62a. The bolt 71 has a general shape, for example. For example, the shaft part 712 of the bolt 71 is inserted first through the second bolt hole 62a and then through the first bolt hole 61a.

Then, the inside screw 11a of the nut body 11 of the security nut 1 is partially meshed with the outside screw 713 of the shaft part 712 inserted through the first bolt hole 61a and the second bolt hole 62a. For example, after the bolt 71 has been held and secured, the inside screw 11a can be partially meshed with the outside screw 713 by rotating the security nut 1 in the tightening direction SB1 while bringing the advancing-direction end 91 of the nut body 11 of the security nut 1 close to the tip of the shaft part 712.

Then, the security nut 1 is further rotated in the tightening direction SB1 by means of a socket wrench 8 having a hexagonal socket 81.

Figure 6:
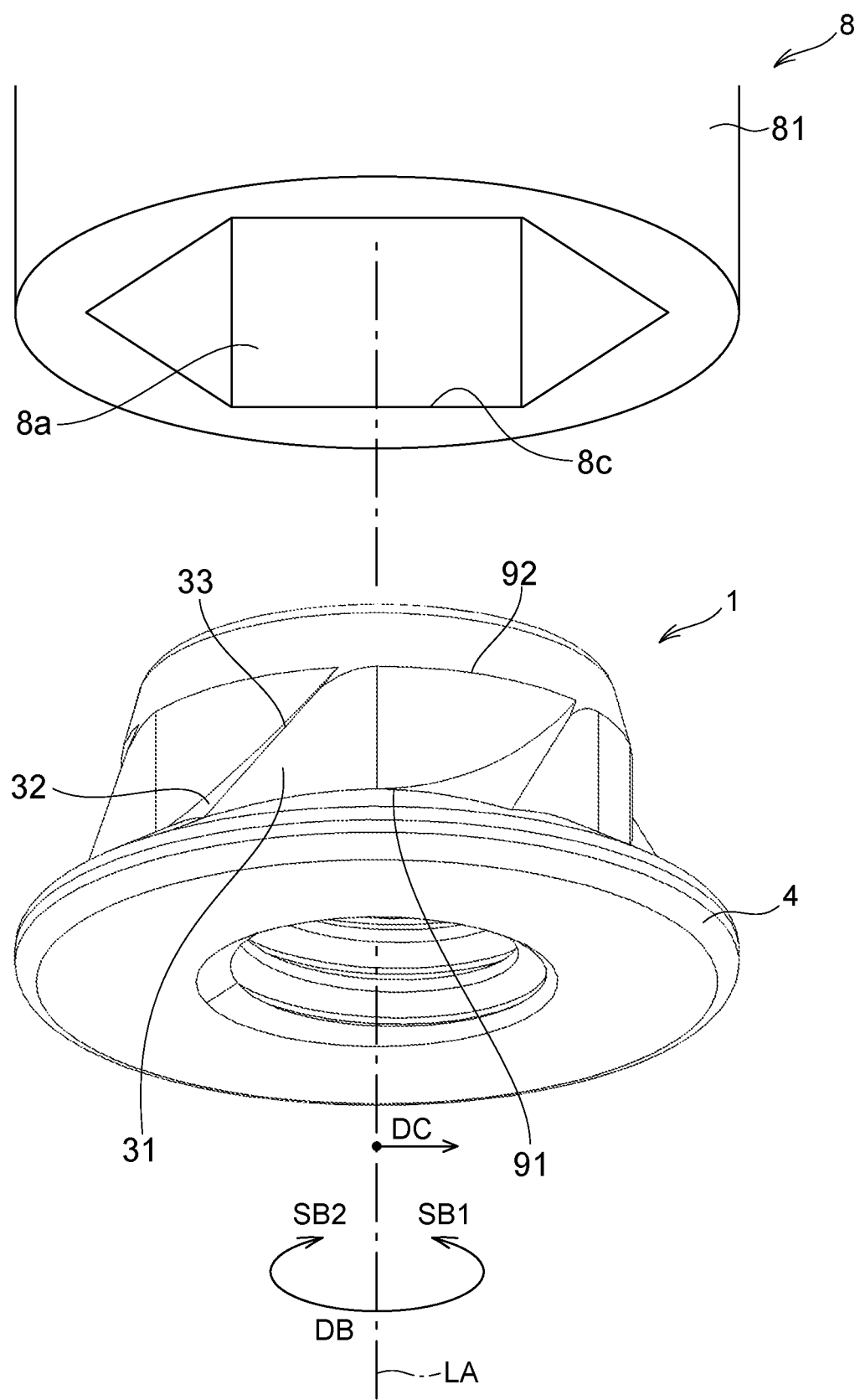
FIG. 6 is a perspective view showing an operation of the security nut according to the first embodiment upon tightening.

The operation of rotating the security nut 1 by means of the socket wrench 8 is further described with reference to FIG. 6. FIG. 6 is a perspective view showing the security nut 1 and the hexagonal socket 81. A part of the security nut 1 is first inserted into the hexagonal socket 81 and the hexagonal socket 81 is engaged with the security nut 1. Since the torque transmission projection 3 has the ridge line 33, the ridge line 33 can be used as a guide for positioning an inside line part 8c when a part of the security nut 1 is inserted into the hexagonal socket 81. Thus, when the hexagonal socket 81 and the security nut 1 are engaged with each other, the ridge line 33 can guide the inside line part 8c of the hexagonal socket 81 to lead an inner surface 8a of the hexagonal socket 81 to the torque transmission surface 31.

In this manner, the torque transmission surface 31 of each torque transmission projection 3 comes into surface-contact with the inner surface 8a of the hexagonal socket 81. Then, the hexagonal socket 81 is rotated in the tightening direction SB1 while the bolt 71 is being secured. At this time, since the torque transmission surface 31 of each torque transmission projection 3 is in surface-contact with the inner surface 8a of the hexagonal socket 81, a torque from the rotating hexagonal socket 81 is transmitted to the security nut 1 through the torque transmission surface 31. This can rotate the security nut 1 in the tightening direction SB1. In this manner, the security nut 1 can be tightened on the bolt 71 by means of a general tool such as the socket wrench 8 having the hexagonal socket 81.

The security nut 1 is further rotated by means of the socket wrench 8 so that the security nut 1 is tightened on the bolt 71, as shown in FIG. 5.

Since the security nut 1 comprises the flange 4 provided on the advancing-direction end 91 of the nut body 11, the following effect can be obtained when the security nut 1 is tightened on a bolt. That is to say, when a plurality of securement members 61, 62 are secured to each other by tightening the security nut 1 on a bolt, the flange 4 is interposed between the torque transmission projections 3 and the securement members 61, 62. Thus, there is no possibility that the torque transmission projections 3 come into direct contact with the securement members 61, 62 so as to be subject to a pressure from the securement members 61, 62. Thus, the torque transmission projections 3 are difficult to be damaged by the pressure from the securement members 61, 62.

(Operation Upon Loosening)

Next, an example of an operation of making difficult the security nut 1 tightened on the bolt 71 to be loosened is described with reference to FIGS. 5 and 6. A case in which one tries to loosen the security nut 1 in the state shown in FIG. 5 is considered. In this case, he/she is considered to engage the hexagonal socket 81 with the security nut 1 and to rotate the hexagonal socket 81 in the loosening direction SB2.

At this time, since the release surface 32 is inclined as described above, the release surface 32 and the inner surface 8a of the hexagonal socket 81 will not come into surface-contact with each other. In this case, the inner surface 8a of the hexagonal socket 81 bears against the ridge lines 33 without being in contact with the release surfaces 32. When the hexagonal socket 81 engaged with the securing nut 1 is further rotated in the loosening direction SB2, the hexagonal socket 81 floats up along the inclination of the ridge lines 33, so that the hexagonal socket 81 is disengaged from the security nut 1. Thus, even when the hexagonal socket 81 engaged with the security nut 1 is rotated toward the loosening direction SB2, no torque is transmitted to the security nut 1 from the hexagonal socket 81, whereby it is impossible to loosen the security nut 1. Thus, the security nut 1 according to the first embodiment can make it difficult to be loosened once it has been tightened.

Second Embodiment

Next, a second embodiment of the present disclosure is described.

The second embodiment relates to a security bolt 2 including a shaft part 22 having an outside screw 22a, and a bolt head part 21 provided on the shaft part 22. The bolt head part 21 has a torque transmission projection 3 having the same structure as the security nut 1 in the first embodiment. Namely, it is difficult for the security bolt 2 shown in the second embodiment to be loosened once it has been tightened. In the second embodiment, differences from the first embodiment are mainly described. In the following description and the drawings used in the following description, parts that can be configured in the same manner as the first embodiment described above are shown by the same reference numerals used for corresponding parts in the first embodiment, and redundant description is omitted.

Figure 7:
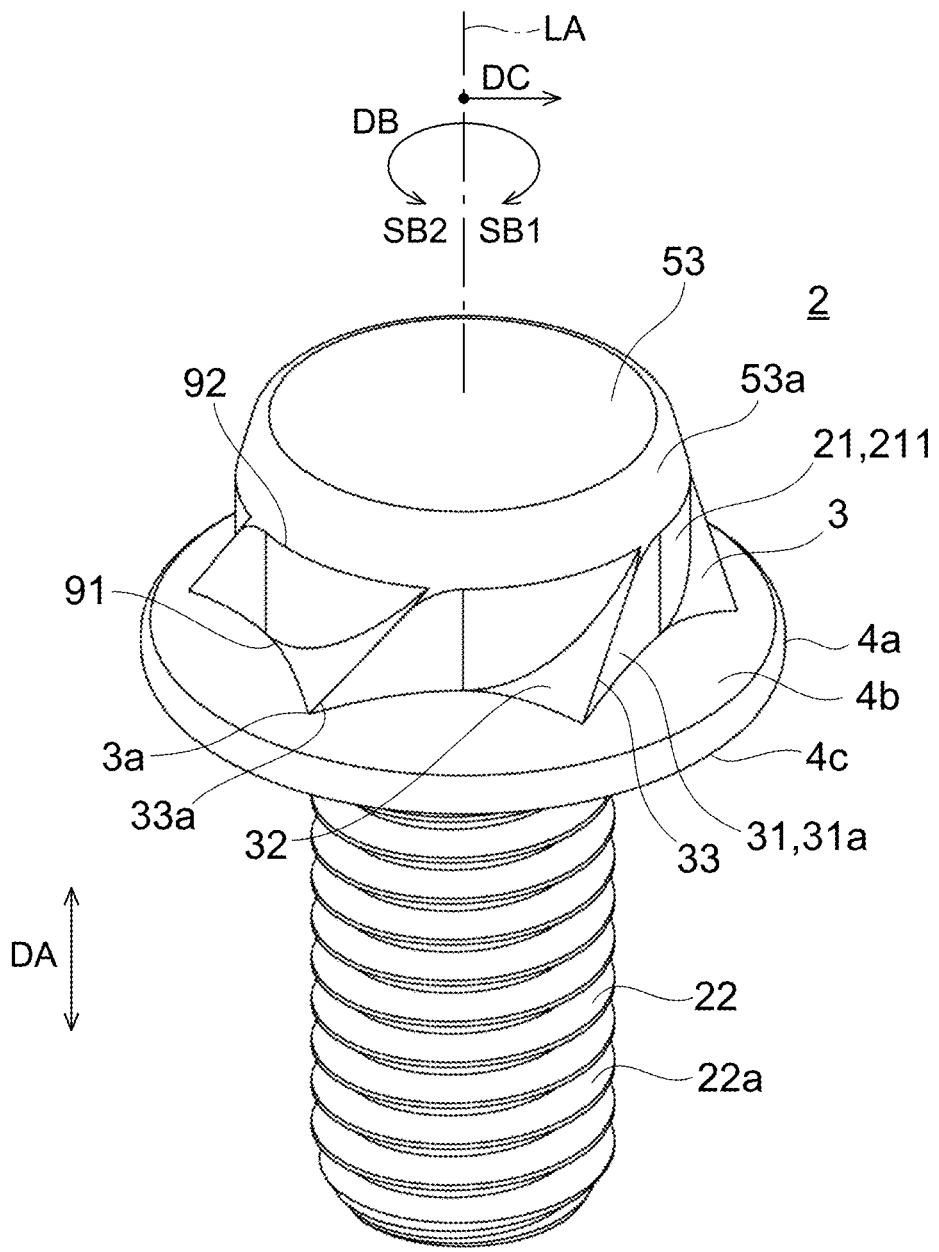
FIG. 7 is a perspective view showing an example of a security bolt according to a second embodiment.

FIG. 7 is a perspective view showing the security bolt 2. As shown in FIG. 7, the security bolt 2 comprises a shaft part 22 having an outside screw 22a, and a bolt head part 21 provided on the shaft part 22. The bolt head part 21 has a bolt head part body 211, and a plurality of torque transmission projections 3 provided on an outer surface 21c of the bolt head part body 211 along a circumferential direction DB. In addition, the bolt head part 21 shown in FIG. 7 has a flange 4 provided on an advancing-direction end 91 of the bolt head part body 211, and a truncated conical protrusion 53 provided on a retracting-direction end 92 of the bolt head part body 211. An axis about which the security bolt 2 is rotated when it is tightened on a nut is referred to as an axis LA, similarly to the axis about which the security nut 1 is rotated when it is tightened on a bolt. In the security bolt 2, a direction of the axis LA is referred to as an axial direction DA and a direction surrounding the axis LA is referred to as a circumferential direction DB, similarly to the security nut 1.

Next, respective constituent elements of the security bolt 2 are further described.

The shaft part 22 is described. As described above, the shaft part 22 is a part of the security bolt 2, which has an outside screw 22a. In the example shown in FIG. 7, the shaft part 22 has a substantially cylindrical shape extending in the axial direction DA, and the outside screw 22a is provided on a side surface of the shaft part 22.

Next, the bolt head part 21 is described first. As described above, the bolt head part 21 of the security bolt 2 has the bolt head part body 211, the torque transmission projections 3, the flange 4, and the truncated conical protrusion 53. The bolt head part body 211 has the same shape as that of the nut body 11 in the first embodiment, except that it does not have the inside screw 11a and the through hole 11b. The description about the nut body 11 in the first embodiment is applied to the description about the bolt head part body 211 in the second embodiment, as long as they are not contradictory to each other. In the bolt head part body 211, an end where the shaft part 22 is located is an advancing-direction end 91. An end of the bolt head part body 211, which is opposed to the advancing-direction end 91, is a retracting-direction end 92.

Figure 8:
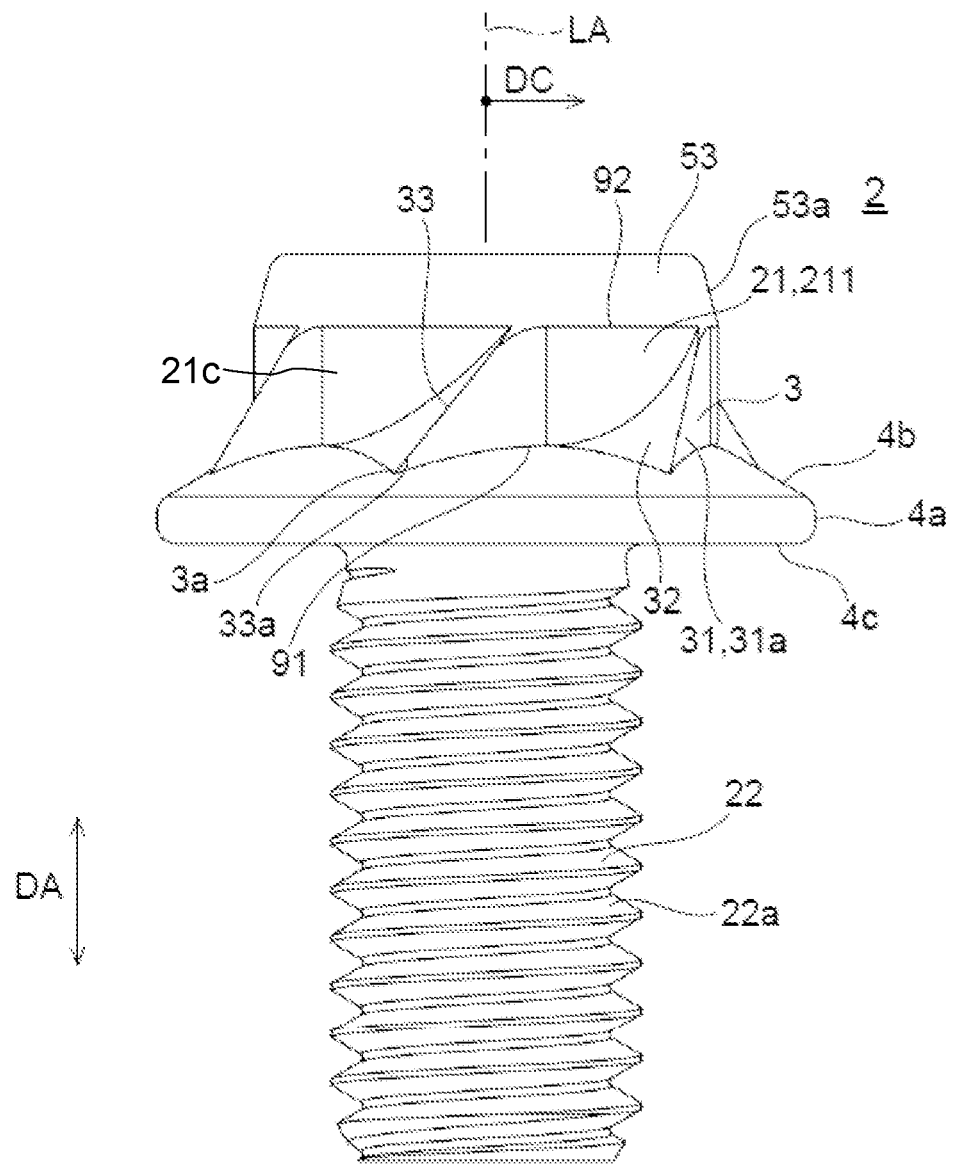
FIG. 8 is a side view showing the example of the security bolt according to the second embodiment.
Figure 9:
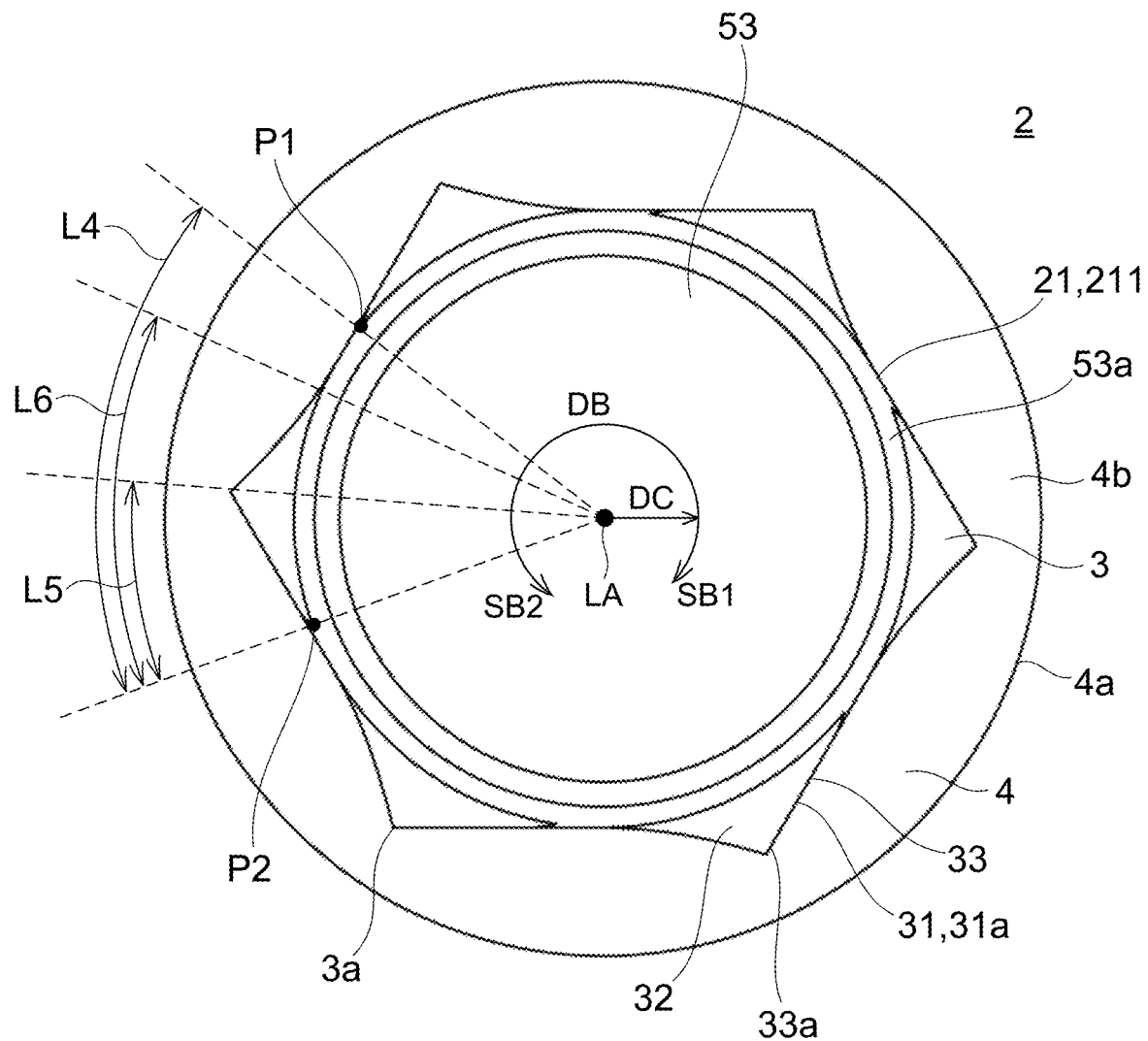
FIG. 9 is a plan view showing the example of the security bolt according to the second embodiment.

Next, the torque transmission projections 3 of the security bolt 2 are described with reference to FIGS. 7 to 9. FIG. 8 is a side view of the security bolt 2 seen from a lateral side. FIG. 9 is a plan view of the security bolt 2 seen from the the retracting-direction end 92 of the bolt head part body 211.

As described above, the security bolt 2 comprises a plurality of the torque transmission projections 3 provided on the outer surface 21c of the bolt head part body 211 along the circumferential direction DB. A shape of the torque transmission projection 3 provided on the bolt head part body 211 and a positional relationship between the torque transmission projections 3 and the bolt head part body 211 are the same as the shape of the torque transmission projection 3 and the positional relationship between the torque transmission projections 3 and the nut body 11 in the first embodiment, as long as they are not contradictory to each other.

Namely, each torque transmission projection 3 has a torque transmission surface 31 provided on an upstream side in a tightening direction SB1 of the security bolt 2, and a release surface 32 provided on a downstream side in the tightening direction SB1 of the security bolt 2. In addition, a ridge line 33 is formed between the torque transmission surface 31 and the release surface 32. The ridge line 33 inclines toward the upstream side of the tightening direction SB1 along the circumferential direction DB, from the advancing-direction end 91 of the bolt head part body 211 to the retracting-direction end 92 of the bolt head part body 211 (see FIG. 8).

A circumferential pitch between the torque transmission projections 3 is represented as L4, a circumferential length of the torque transmission surface 31 of each torque transmission projection 3 is represented as L5, and a circumferential length L6 of the release surface 32 of each torque transmission projection 3 is represented as L6. In this case, the circumferential pitch L4 between the torque transmission projections 3, the circumferential length L5 of the torque transmission surface 31, and the circumferential length L6 of the release surface 32 preferably satisfy the following relationships.

$$0.5 \times L6 \leq L5 \leq L6 \qquad \text{Expression (3)}$$

$$0.2 \times L4 \leq L5 \leq 0.4 \times L4 \qquad \text{Expression (4)}$$

When the circumferential pitch L4 between the torque transmission projections 3, the circumferential length L5 of the torque transmission surface 31, and the circumferential length L6 of the release surface 32 satisfy the Expressions (3) and (4), the security bolt 2 can have an effect corresponding to the effect obtained in the security nut 1 according to the first embodiment wherein the circumferential pitch L4 between the torque transmission projections 3, the circumferential length L5 of the torque transmission surface 31, and the circumferential length L6 of the release surface 32 satisfy the Expressions (1) and (2).

As described above, the bolt head part 21 has the flange provided on the advancing-direction end 91 of the bolt head part body 211. A shape of the flange 4 provided on the bolt head part 21 and a positional relationship between the flange 4 and the bolt head part body 211 are the same as the shape of the flange 4 and the positional relationship between the flange 4 and the nut body 11 in the first embodiment, as long as they are not contradictory to each other.

As described above, the bolt head part 21 has the truncated conical protrusion 53 provided on the retracting-direction end 92 of the bolt head part body 211. The truncated conical protrusion 53 has a shape that inhibits the security bolt 2 from being grasped by means of a general tool such as pliers. In the example shown in FIG. 8, an outer surface 53a of the truncated conical protrusion 53 is inclined to expand outward in the radial direction DC toward the advancing-direction end 91. Since the outer surface 53a of the truncated conical protrusion 53 is inclined to expand outward in the radial direction DC toward the advancing-direction end 91, it is difficult to grasp the outer surface 53a by means of a general tool such as pliers, which makes it difficult to loosen the security bolt 2 by means of a general tool.

(Operation)

Next, an operation of the security bolt 2 as structured above is described.

(Operation Upon Tightening)

Figure 10:
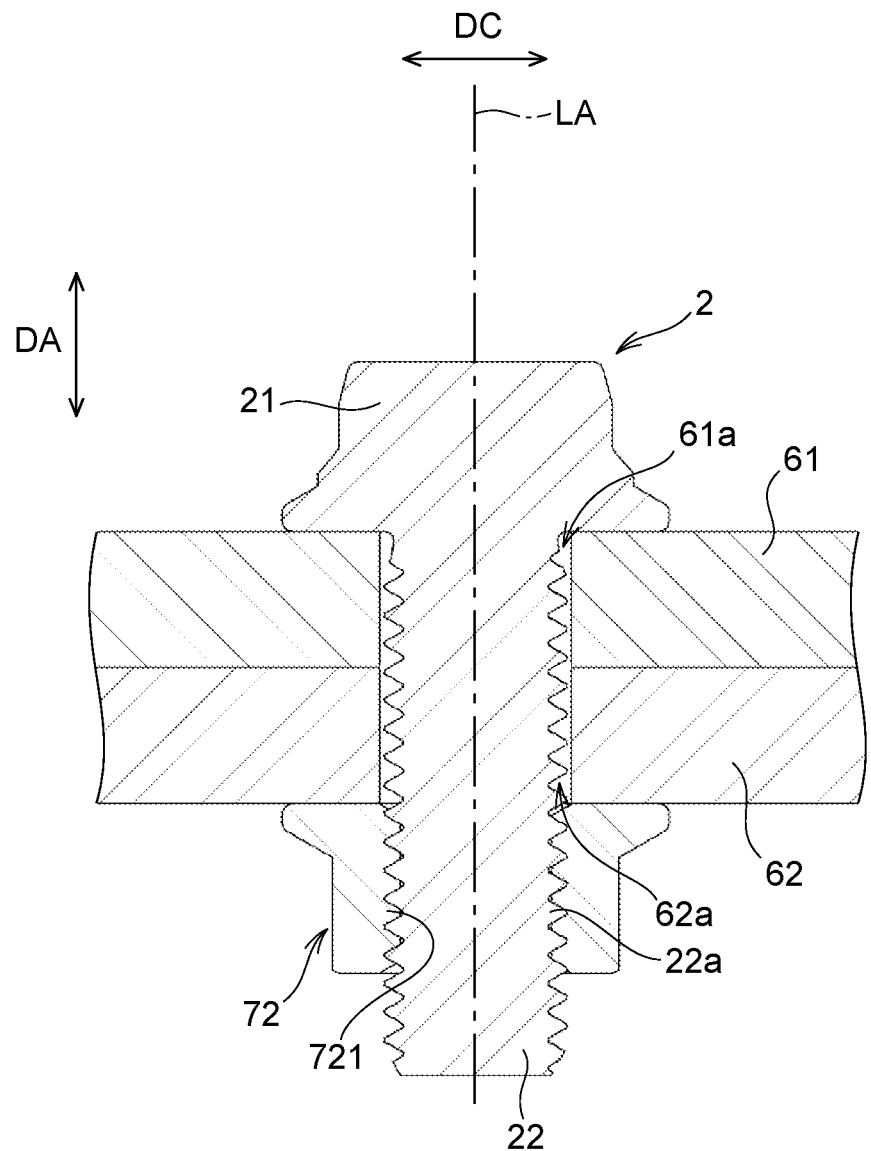
FIG. 10 is a sectional view showing that the security bolt according to the second embodiment is tightened on a general nut.

An example of an operation when the security bolt 2 is tightened on a nut is described first with reference to FIG. 10. FIG. 10 is a sectional view showing that a plurality of securement members 61, 62 are secured to each other by tightening the security bolt 2 on a nut 72. In the example shown in FIG. 10, the plate-shaped first securement member 61 and the plate-shaped second securement member 62 are secured to each other by tightening the security bolt 2 on the nut 72.

As shown in FIG. 10, when the security bolt 2 is tightened on the nut 72, the first securement member 61 provided with a first bolt hole 61*a* and the second securement member 62 provided with a second bolt hole 62*a* are prepared first.

Then, the first securement member 61 and the second securement member 62 are stacked such that the first bolt hole 61*a* and the second bolt hole 62*a* are aligned.

Then, the shaft part 22 of the security bolt 2 is inserted through the first bolt hole 61*a* and the second bolt hole 62*a*. For example, the shaft part 22 of the security bolt 2 inserted first through the second bolt hole 62*a* and then through the first bolt hole 61*a*.

Then, the nut 72 comprising an inside screw 721 is prepared. The inside screw 721 of the nut 72 is partially meshed with the outside screw 22*a* of the shaft part 22 inserted through the first bolt hole 61*a* and the second bolt hole 62*a*. The nut 72 has, for example, a general shape. For example, after the security bolt 2 has been held and secured, the inside screw 721 can be partially meshed with the outside screw 22*a* by rotating the nut 72 while bringing the inside screw 721 of the nut 72 close to the tip of the shaft part 22.

Then, the security bolt 2 is rotated in the tightening direction SB1 by means of a socket wrench 8 having a hexagonal socket 81 as shown in FIG. 6. Specifically, a part of the bolt head part 21 of the security bolt 2 is inserted into the hexagonal socket 81 and the hexagonal socket 81 is engaged with the security bolt 2. Then, after the nut 72 has been held and secured, the hexagonal socket 81 is rotated in the tightening direction SB1. Thus, the security bolt 2 can be rotated in the tightening direction SB1. By rotating the security bolt 2 by means of the socket wrench 8, the security bolt 2 is tightened on the nut 72, as shown in FIG. 10. In this manner, the security bolt 2 can be tightened on the nut 72 by means of a general tool such as the socket wrench 8 having the hexagonal socket 81.

An effect caused by the torque transmission projections 3 when the security bolt 2 is tightened on the nut 72 is the same as the effect caused by the torque transmission projections 3 when the security nut 1 is tightened on the bolt 71 according to the first embodiment.

(Operation Upon Loosening)

Because of the same operation as the operation of making difficult the security nut 1 tightened on the bolt 71 according to the first embodiment to be loosened, the security bolt 2 tightened on the nut 72 can be made difficult to be loosened.

The aspect of the present invention is not limited to the aforementioned embodiments, but includes various modification examples conceivable by those skilled in the art. The effect of the present invention is also not limited to the aforementioned effect. Namely, various additions, changes and partial deletions are possible to the extent that they do not deviate from the conceptual idea and purpose of the invention derived from the contents specified in the claims and their equivalents.

1 Security nut
11 Nut body
11*a* Inside screw
11*b* Through hole
2 Security bolt
21 Bolt head part
22 Shaft part
22*a* Outside screw
3 Torque transmission projection
31 Torque transmission surface
31*a* Parallel surface
32 Release surface
33 Ridge line
4 Flange
51 Annular protrusion
53 Truncated conical protrusion
8 Socket wrench
81 Hexagonal socket
91 Advancing-direction end
92 Retracting-direction end

What is claimed is:

1. A security nut comprising:
a nut body having an inside screw; and
a plurality of torque transmission projections provided on an outer surface of the nut body along a circumferential direction;
wherein:
each torque transmission projection has a torque transmission surface provided on an upstream side in a tightening direction of the security nut, and a release surface provided on a downstream side in the tightening direction of the security nut;
a ridge line is formed between the release surface and the torque transmission surface, the ridge line inclining toward the upstream side of the tightening direction along the circumferential direction, from an advancing-direction end of the nut body to a retracting-direction end of the nut body; and
L1, L2 and L3 satisfy below relationships:

$$0.5 \times L3 \leq L2 \leq L3 \qquad \text{Expression (1)}$$

$$0.2 \times L1 \leq L2 \leq 0.4 \times L1 \qquad \text{Expression (2)}$$

where L1 represents a circumferential pitch between the plurality of torque transmission projections, L2 represents a circumferential length of the torque transmission surface of each torque transmission projection, and L3 represents a circumferential length of the release surface of each torque transmission projection.

2. The security nut according to claim 1, wherein a flange is provided on the advancing-direction end of the nut body.

3. The security nut according to claim 1, wherein an annular protrusion is provided on the retracting-direction end of the nut body.

4. The security nut according to claim 2, wherein an annular protrusion is provided on the retracting-direction end of the nut body.

5. A security bolt comprising:
a shaft part having an outside screw; and
a bolt head part provided on the shaft part, the bolt head part having a bolt head part body, and a plurality of torque transmission projections provided on an outer surface of the bolt head part body along a circumferential direction;
wherein:
each torque transmission projection has a torque transmission surface provided on an upstream side in a tightening direction of the security bolt, and a release surface provided on a downstream side in the tightening direction of the security bolt;

a ridge line is formed between the release surface and the torque transmission surface, the ridge line inclining toward the upstream side of the tightening direction along the circumferential direction, from an advancing-direction end of the bolt head part body to a retracting-direction end of the bolt head part body; and L4, L5 and L6 satisfy below relationships:

$$0.5 \times L6 \leq L5 \leq L6 \qquad \text{Expression (3)}$$

$$0.2 \times L4 \leq L5 \leq 0.4 \times L4 \qquad \text{Expression (4)}$$

where L4 represents a circumferential pitch between the plurality of torque transmission projections, L5 represents a circumferential length of the torque transmission surface of each torque transmission projection, and L6 represents a circumferential length of the release surface of each torque transmission projection.

6. The security bolt according to claim 5, wherein the bolt head part body has a flange provided on the advancing-direction end of the bolt head part body.

7. The security bolt according to claim 5, wherein the bolt head part body has a truncated conical protrusion provided on the retracting- direction end of the bolt head part body.

8. The security bolt according to claim 6, wherein the bolt head part body has a truncated conical protrusion provided on the retracting- direction end of the bolt head part body.

\* \* \* \* \*